US00RE41601E

(19) United States
(12) Reissued Patent
Matsuzaki et al.

(10) Patent Number: US RE41,601 E
(45) Date of Reissued Patent: Aug. 31, 2010

(54) INK CARTRIDGE FOR INK-JET PRINTING APPARATUS

(75) Inventors: Makoto Matsuzaki, Nagano-ken (JP); Satoshi Shinada, Nagano-ken (JP)

(73) Assignee: Seiko Epson Corporation, Tokyo (JP)

(21) Appl. No.: 11/799,757

(22) Filed: May 1, 2007

Related U.S. Patent Documents

Reissue of:
(64) Patent No.: 6,416,152
Issued: Jul. 9, 2002
Appl. No.: 09/312,065
Filed: May 13, 1999

(30) Foreign Application Priority Data

May 13, 1998 (JP) ..... 10-146680
May 18, 1998 (JP) ..... 10-151882
May 18, 1998 (JP) ..... 10-151883

(51) Int. Cl.
*B41J 29/393* (2006.01)

(52) U.S. Cl. ..... 347/19; 347/86; 347/87
(58) Field of Classification Search ..... 347/19, 347/85, 86, 87, 5, 7
See application file for complete search history.

(56) References Cited

U.S. PATENT DOCUMENTS

| | | | | | |
|---|---|---|---|---|---|
| 4,253,103 | A | | 2/1981 | Heinzl et al. | |
| 4,471,872 | A | * | 9/1984 | Dedow | 206/720 |
| 4,639,933 | A | * | 1/1987 | Howell et al. | 375/321 |
| 5,262,802 | A | | 11/1993 | Karita et al. | |
| 5,365,312 | A | | 11/1994 | Hillmann et al. | |
| 5,398,257 | A | * | 3/1995 | Groenteman | 375/130 |
| 5,406,315 | A | * | 4/1995 | Allen et al. | 347/7 |
| 5,411,343 | A | | 5/1995 | Childers | |
| 5,477,963 | A | * | 12/1995 | Mochizuki et al. | 206/701 |
| 5,506,611 | A | * | 4/1996 | Ujita et al. | 347/86 |
| 5,541,631 | A | | 7/1996 | Hashimoto | |
| 5,594,481 | A | | 1/1997 | Keefe et al. | |
| 5,646,660 | A | * | 7/1997 | Murray | 347/59 |
| 5,748,210 | A | | 5/1998 | Watanabe et al. | |
| 5,781,208 | A | | 7/1998 | Karita et al. | |
| 5,847,735 | A | * | 12/1998 | Betschon | 347/86 |
| 5,850,238 | A | | 12/1998 | Karita et al. | |
| 5,971,525 | A | | 10/1999 | Inoue et al. | |
| 6,074,041 | A | | 6/2000 | Imanaka et al. | |
| 6,102,517 | A | | 8/2000 | Kobayashi et al. | |
| 6,168,262 | B1 | | 1/2001 | Clark et al. | |
| 6,209,980 | B1 | | 4/2001 | Kobayashi et al. | |
| 6,227,643 | B1 | * | 5/2001 | Purcell et al. | 347/19 |
| 6,502,916 | B1 | | 1/2003 | Naka | |
| 6,502,917 | B1 | | 1/2003 | Shinada et al. | |

FOREIGN PATENT DOCUMENTS

| | | | | |
|---|---|---|---|---|
| DE | 26 10 518 | A1 | | 9/1977 |
| DE | 86 31 850 | U | | 4/1987 |
| DE | 42 14 446 | A1 | | 11/1993 |
| DE | 91 16 990.9 | | | 1/1995 |
| DE | 295 13 646 | U1 | | 5/1996 |
| DE | 297 11 115 | U1 | | 12/1997 |
| DE | 197 48 857 | A1 | | 8/1998 |
| EP | 0 276 403 | | | 8/1988 |
| EP | 0 313 205 | A2 | | 4/1989 |
| EP | 0 412 459 | A2 | | 2/1991 |
| EP | 0 412 459 | | | 2/1991 |
| EP | 0 429 179 | A2 | | 5/1991 |
| EP | 0 440 261 | | * | 8/1991 |
| EP | 0 581 298 | A2 | | 2/1994 |

(Continued)

*Primary Examiner*—Lam S Nguyen
(74) *Attorney, Agent, or Firm*—Stroock & Stroock & Lavan LLP

(57) ABSTRACT

An ink cartridge is composed of the body of a container provided with an ink supply port for discharging ink into a print head for housing ink and a lid for sealing the body of the container so that the container can communicate with the air. A semiconductor memory device storing information related to ink is mounted on the surface of the body of the container or the cap and is coated with a removable film.

83 Claims, 11 Drawing Sheets

FOREIGN PATENT DOCUMENTS

| | | | | |
|---|---|---|---|---|
| EP | 0 622 235 | A2 | | 11/1994 |
| EP | 0 710 568 | A2 | | 5/1996 |
| EP | 08 197 748 | | * | 6/1996 |
| EP | 0 724 966 | A2 | | 8/1996 |
| EP | 0 789 322 | A2 | | 8/1997 |
| EP | 0 789 322 | | | 8/1997 |
| EP | 0 854 043 | | * | 7/1998 |
| EP | 0 854 044 | | * | 7/1998 |
| EP | 0 854 043 | | * | 12/1998 |
| GB | 2 293 140 | A | | 3/1996 |
| GB | 2 293 141 | A | | 3/1996 |
| GB | 2 293 142 | A | | 3/1996 |
| JP | 62-184856 | A | | 8/1987 |
| JP | 3-67657 | | * | 3/1991 |
| JP | 03-101944 | A | | 4/1991 |
| JP | 3-227626 | A | | 10/1991 |
| JP | 3-227629 | A | | 10/1991 |
| JP | 05-084925 | A | | 4/1993 |
| JP | 07-060953 | A | | 3/1995 |
| JP | 7-232438 | | * | 9/1995 |
| JP | 08-102820 | A | | 4/1996 |
| JP | 08-132635 | A | | 5/1996 |
| JP | 8-174839 | A | | 7/1996 |
| JP | 8-197750 | A | | 8/1996 |
| JP | 08-216429 | A | | 8/1996 |
| JP | 2000-103087 | | | 4/2000 |
| WO | 90/00974 | A1 | | 2/1990 |
| WO | WO 96/05061 | | * | 2/1996 |
| WO | 97/23352 | A1 | | 7/1997 |
| WO | 97/28001 | A1 | | 8/1997 |
| WO | 98/04414 | A1 | | 2/1998 |
| WO | 98/55318 | A1 | | 12/1998 |
| WO | 99/59823 | A1 | | 11/1999 |

* cited by examiner

INK CARTRIDGE FOR INK-JET PRINTING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an ink cartridge suitable for an ink-jet printing apparatus in which an ink-jet print head is provided to a reciprocating carriage and an ink cartridge is detachably mounted on the carriage, and more particularly relates to an ink cartridge provided with a memory device such as a semiconductor chip storing thereon information related to the ink cartridge or ink contained in the ink cartridge.

2. Related Art

An ink-jet printing apparatus with a print head generates a driving signal in accordance with print data and applies the signal to a pressure generating section such as a piezoelectric vibrator and a heating section, to pressure ink within a pressure generating chamber and eject ink droplets from nozzle apertures formed in the print head. The ink-jet printing apparatus of this type is also provided with an ink cartridge for supplying ink to the print head.

As the printing quality is determined by the resolution of a print head and, in addition, greatly depends upon the viscosity of ink, a condition of bleeding on a recording medium and the like, the characteristics of ink and a driving signal applied to the print head are improved to enhance the quality of printing. Further, the cycle of ink-missing ejection has been improved to prevent the nozzle apertures from being clogged, and also the maintenance conditions such as forced ejection of ink droplets into a cap of a cleaning mechanism has been improved.

Therefore, there has often been proposed a semiconductor memory device storing data related to ink or ink cartridge which is provided to an ink cartridge, so that the data is read from the memory device by a printing apparatus, printing is executed under an optimum condition, or data related to a state in which the ink cartridge is used is stored in the semiconductor memory device. For example, as disclosed in Japanese published unexamined patent application No. Hei. 3-67657, there has been proposed an ink cartridge wherein a semiconductor memory chip is mounted on an upper surface of a container composing the ink cartridge so that data can be read out by a printing apparatus via a substrate. Further, an ink cartridge is known wherein a recessed portion is formed in the ink cartridge and a semiconductor memory chip is fitted in the recessed portion so that data can be read out.

However, as the above semiconductor memory chip is mounted in a state in which it is always left exposed, there is a problem that users may readily come to touch the semiconductor memory chip with their fingers, and the memory chip may be broken or lost due to static electricity or other factors. If such happens, the printing apparatus would not read out information stored on the semiconductor memory chip for proper printing.

According to the conventional ink cartridge with a semiconductor memory device, it is required to provide an extra mechanism for fixing the semiconductor memory device to an ink cartridge which causes another problem of rising up the manufacturing cost and also the manufacturing process becomes complicated.

SUMMARY OF THE INVENTION

An ink cartridge, including a housing for containing ink therein, has an opening. A lid covers the opening of the housing. An ink supply port is formed on a wall of the housing, the ink supply port discharging ink out of the housing. A memory device storing information relating to the ink cartridge or ink in the cartridge is mounted to one of the housing or lid and a seal member is affixed to a part of the housing and the memory device.

Accordingly, it is an object of the invention to provide an improved cartridge for an ink-jet printer.

Another object of the present invention is to provide an ink cartridge for an ink-jet printing apparatus capable of preventing information related to the ink cartridge or ink in the cartridge from being broken or lost due to the rough handling of a user.

A further object of the present invention is to provide an ink cartridge for an ink-jet printing apparatus which enables a memory device such as a semiconductor chip to be readily mounted without requiring special mechanism and structure of the cartridge.

Yet another object of the present invention is to provide an ink jet printing apparatus mounting thereon an ink cartridge with a memory device capable of achieving any one of the foregoing objects.

Still another object of the present invention is to provide a sticker component including a seal tape and a memory device such as a semiconductor chip for an ink cartridge mountable on an ink jet printing apparatus, which sticker component capable of achieving any one of the foregoing objects.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings (s), in which.

PREFERRED EMBODIMENTS OF THE INVENTION

Figure 1:
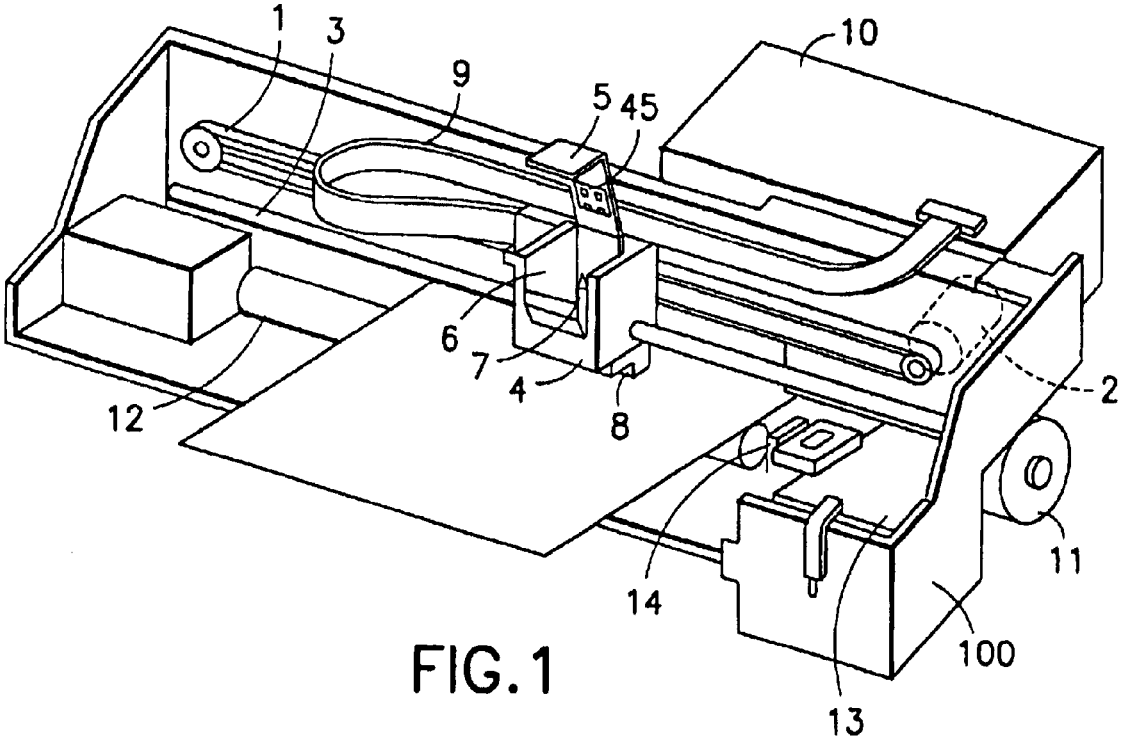
FIG. 1 is a perspective view of an embodiment of a printer mechanism of an ink-jet printing apparatus for executing printing using an ink cartridge according to the present invention.

FIG. 1 shows an embodiment of a printing mechanism for an ink-jet printer for executing printing using an ink cartridge according to the present invention. A carriage 4 mounted on a guide bar 3 within a frame 100 is connected to a drive motor 2 and a timing belt 1 for reciprocal motion along guide bar 3. A cartridge holder 6 provided with a pivotable lever 5 is formed on a carriage 4. A print head 8 to which ink is supplied from the ink cartridge via an ink supply needle 7 is also provided on the lower surface of carriage 4.

The carriage 4 connects to a control section 10 described later via a flexible cable 9. The printing apparatus is also provided with a paper feed motor 11 for driving a paper feed mechanism 12, a pump unit 13, a cleaning mechanism 14 for cleaning the clogging of nozzle apertures of the print head 8.

Figure 2:
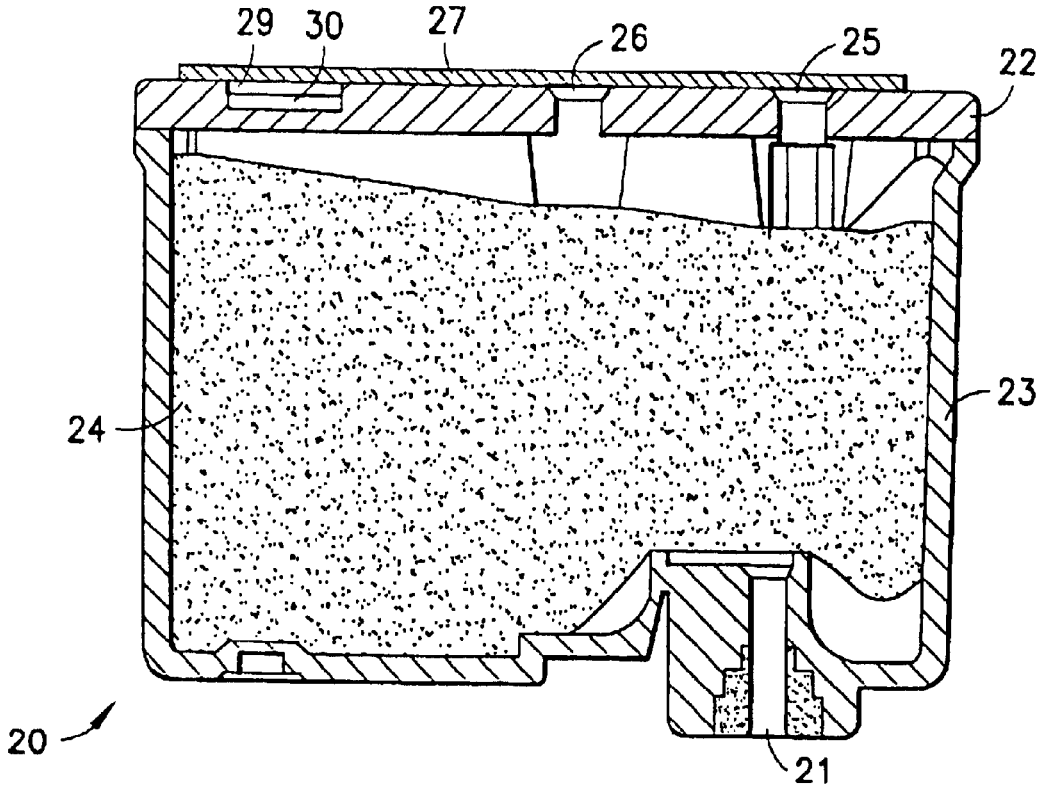
FIG. 2 is a sectional view showing an embodiment of the ink cartridge according to the present invention.

FIG. 2 shows an embodiment of an ink cartridge 20. The ink cartridge includes a container 23 having an ink supply port 21 at the bottom thereof into which an ink supply needle 7 of the printing apparatus is inserted. An opening is provided at the top of container 23 which is sealed with a lid 22. A porous member 24 impregnated with ink is accommodated in the container 23.

An ink inlet 25 and an air communicating port 26 are formed in a surface of the lid 22. The air communicating port 26 connects to an end of a fine groove 28 sealed by a sealing film 27 as shown in FIG. 3. The sealing film 27 is provided with a first seal part 27a and a removable second seal part 27b. The fine groove 28 formed on an outer surface of the lid 22 performs to generate the capillary action. The other end of the fine groove 28 extends to an area which is covered by the removable second seal part 27b of the sealing film 27. A recessed portion 29 is formed in a position of lid 22 covered by the second, removable part 27b of the film 27. A memory device 30 fits in the recessed portion 29. According to the present embodiment, the sealing film 27 sticks onto the lid 22 and covers the memory device 30 fitted in the recessed portion 29 in such a manner that a gap is defined between the memory device 30 and the sealing film 27. Further, no sticking layer or material is applied to the part of the sealing film 27 which faces the recessed portion 29. It is desirable that the sealing film 27 in an area sealing the recessed portion 29 is formed at least partly from a material having an air impermeable characteristics and/or electrical conductivity. In a case where the sealing film 27 is conductive, because the conductive material holds and discharges the static electricity the adverse affect due to the static electricity is hardly applied to the memory storing part of the memory device 30.

Figure 4:
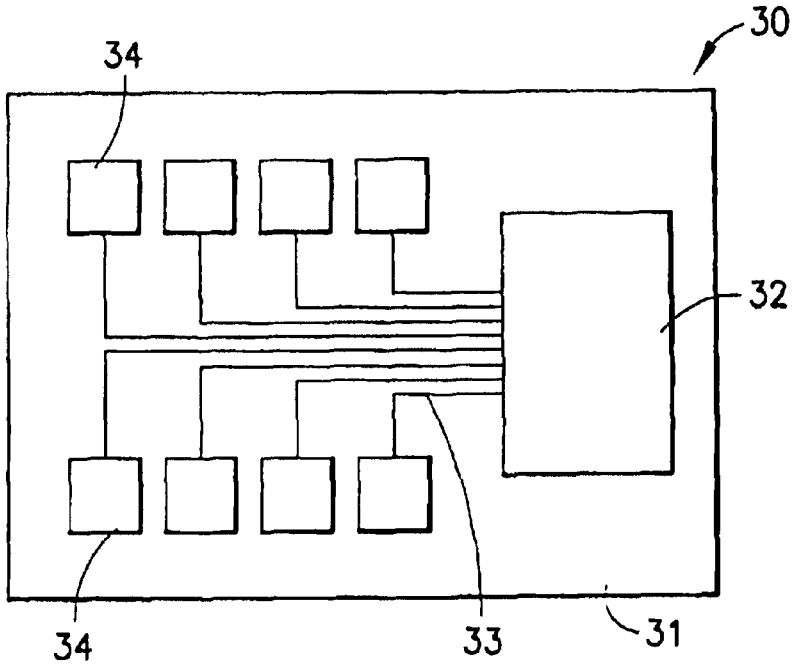
FIG. 4 is a top plan view showing an embodiment of a memory device mounted on the ink cartridge.

FIG. 4 shows an embodiment of the memory device 30, which serves as a memory module for storing information therein. A semiconductor memory chip 32 serving as an information storing part is mounted on a circuit board 31. Conductive patterns 33 formed on circuit board 31, are respectively connected to the semiconductor memory chip 32 and electrodes 34 mounted on circuit board 31, which are respectively connected to a group of contacts of the printing apparatus.

Figure 3A:
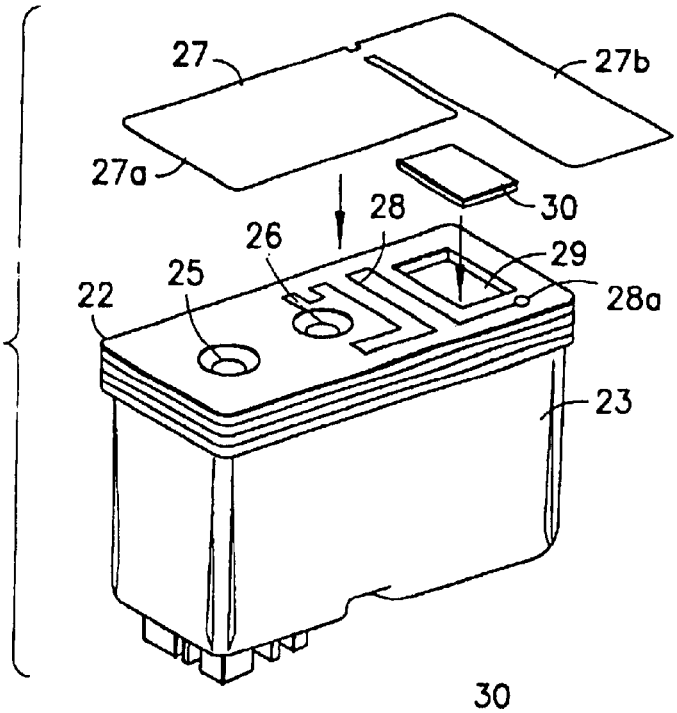
FIGS. 3(a) to 3(c) are perspective views respectively showing the embodiment of the ink cartridge in a state before a film is installed, in a state in which a film is installed and in a state in which a part of a film is peeled for use.
Figure 3B:
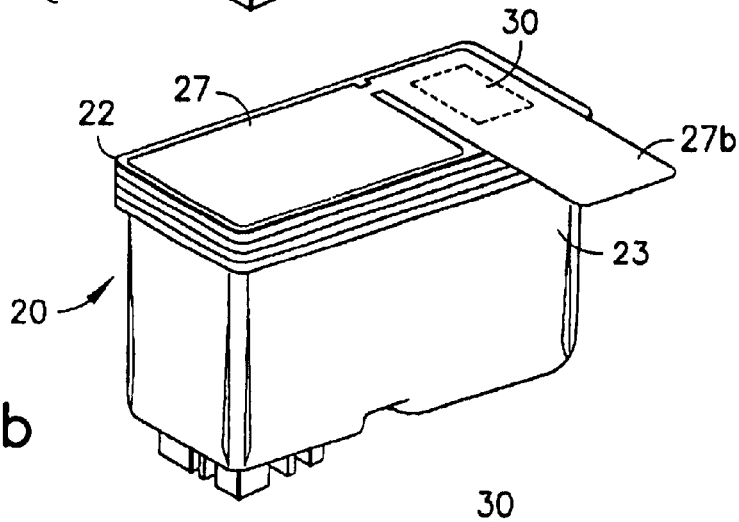

As shown in FIG. 3a, after the memory device 30 is mounted so that it fits into the recessed portion 29 formed in the lid 22 of the ink cartridge 20 and decompression processing is applied if necessary, the sealing film 27, which has sufficient air impermeable characteristics is affixed to the outer surface of the lid 22. Film 27 covers the ink inlet 25, the air communicating port 26, the fine groove 28 and the recessed portion 29 with the semiconductor memory chip 30 therein.

Figure 5:
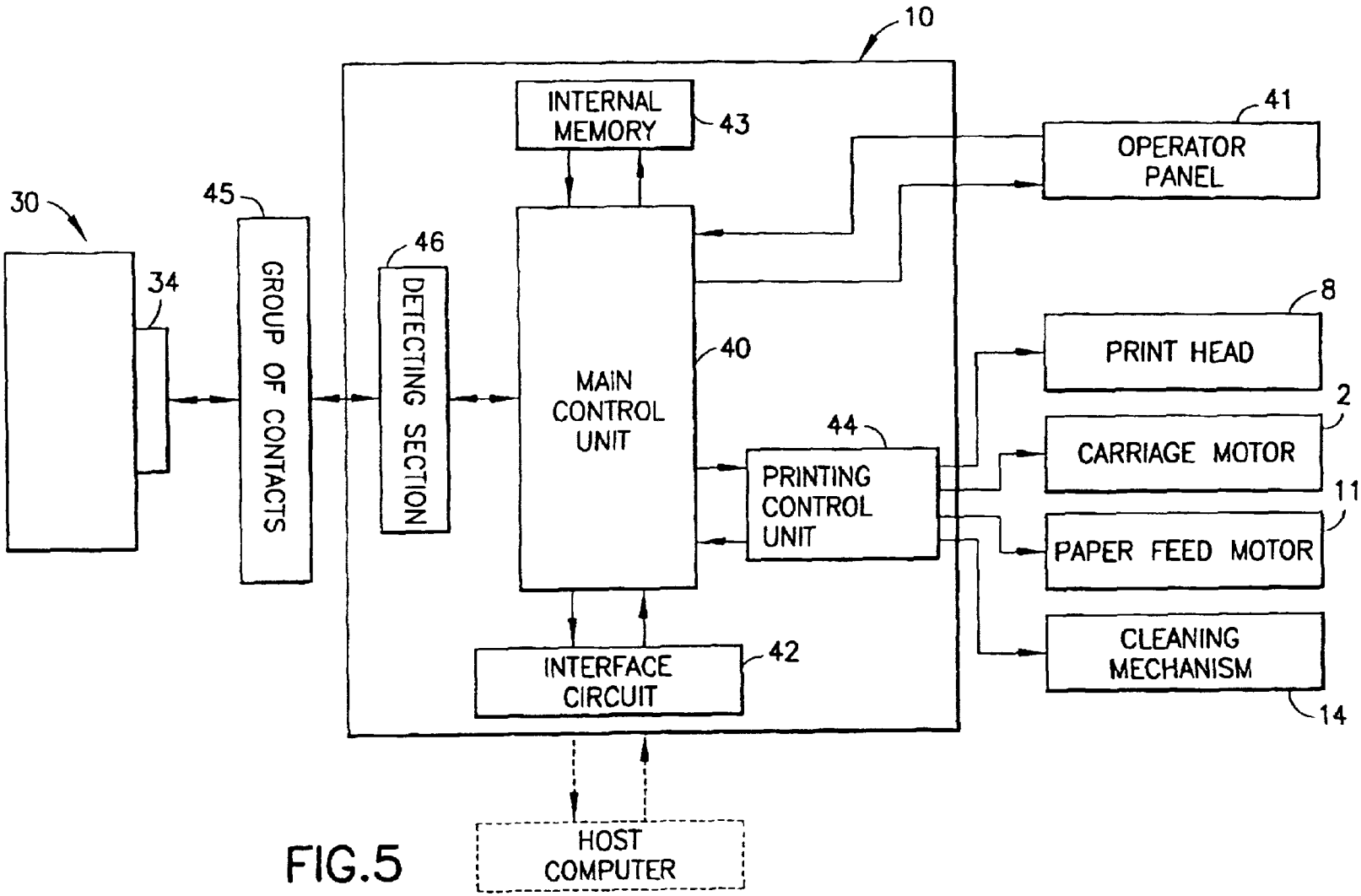
FIG. 5 is a block diagram showing an embodiment of a controller.

FIG. 5 shows an embodiment of control section 10. A main control unit 40 receives print data from a host computer via an interface circuit 42 according to a command from an operator panel 41 and controls a printing control unit 44 based upon the print data according to a control program stored in an internal memory 43. The printing control unit 44 controls printing operation to drive the carriage motor 2 and the paper feed motor 11. As a result, the print head 8 vertically and horizontally scans and ink droplets are ejected from nozzles of the print head 8. The control section 10 also operates the cleaning mechanism 14 to cope with the clogging of the print head 8 when a command is issued via the operator panel 41 or when a power source is turned on.

In addition to the above regular control operation in the ink-jet printing apparatus, the main control unit 40 controls printing operation by communicating with the memory device 30 provided to the ink cartridge 20 and reading the information of the ink cartridge such as the ink composition, production date code, model number or the like.

Communication between the memory device 30 of the ink cartridge 20 and the printing apparatus is executed in this embodiment when a detecting section 46 detects new connection between each electrode 34 of the memory device 30 and the respective one of the group of contacts 45 provided to the lever 5 or when the main control unit 40 reads data stored in the semiconductor chip 32 in power on.

In this embodiment, when the ink cartridge 20 is distributed and a user unpacks the ink cartridge, the memory device 30 is still covered with the sealing film 27 and is still out of contact with a user.

Figure 3C:
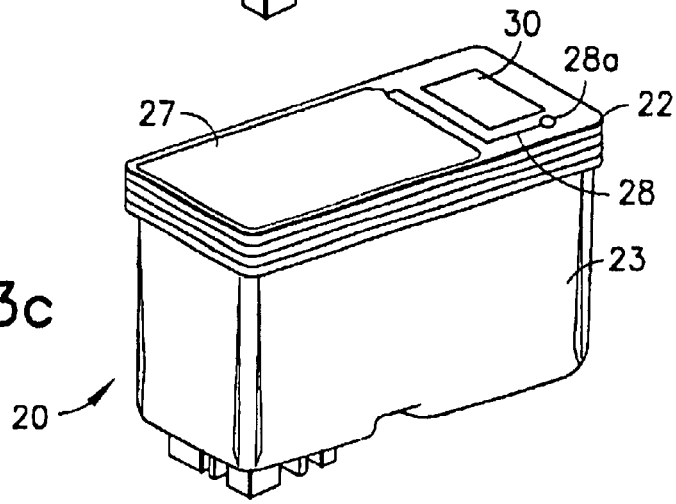
Figure 6:
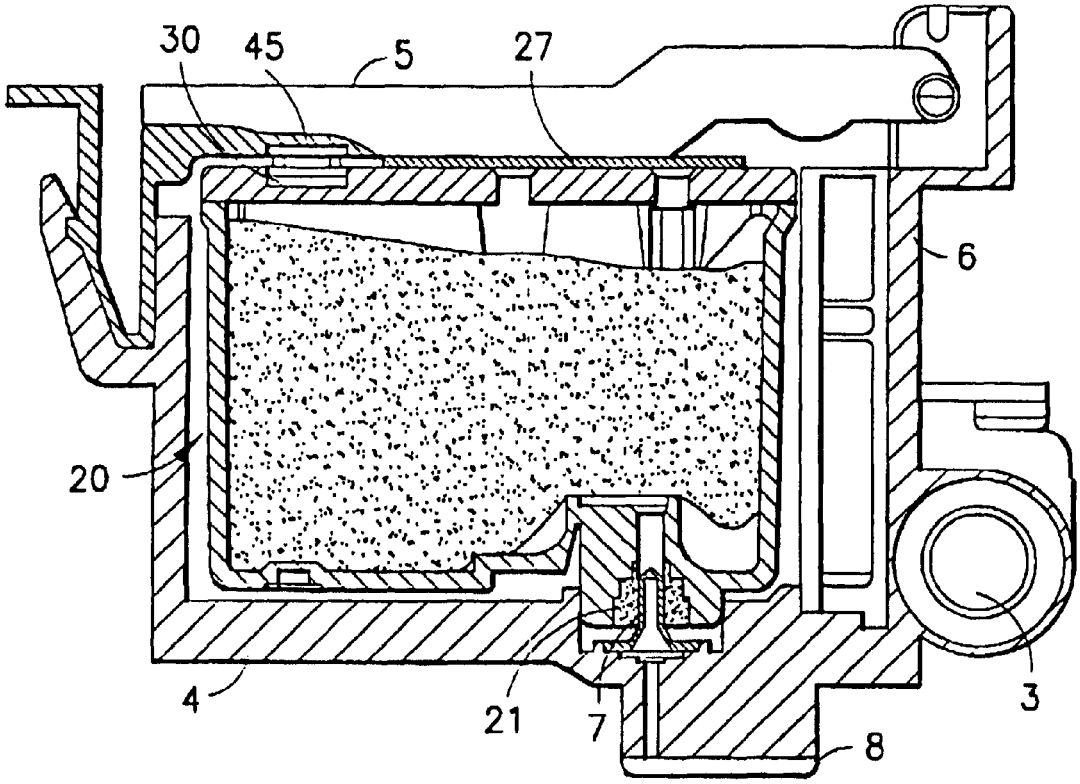
FIG. 6 is a sectional view showing the ink cartridge installed in the printing apparatus in accordance with the invention.

When a removable part 27(b) of the film 27 is peeled as shown in FIG. 3(c) before the use of the ink cartridge, an air communication hole 28a and a part of the fine, circuitous groove 28 becomes open to atmospheric air as does the memory device 30. In this state, when the ink cartridge 20 is installed in the holder 6 with the ink cartridge properly directed and the lever 5 is turned to close holder 6 the ink supply needle 7 inserts into the ink supply port 21 as shown in FIG. 6. The ink supply from the ink cartridge 20 to the print head 8 is enabled and as each of the group of contacts 45 of the lever 5 and each electrode 34 of the memory device 30 come into contact, the information of the ink cartridge 20 is read out from the memory device 30 and then a proper or optimum printing is enabled.

In this embodiment, as the memory device 30 is housed in the recessed portion 29 integrated with the ink cartridge 20, the electrodes 34 are precisely positioned, and secure communicating between the electrodes and the printing apparatus can be secured.

Figure 7A:
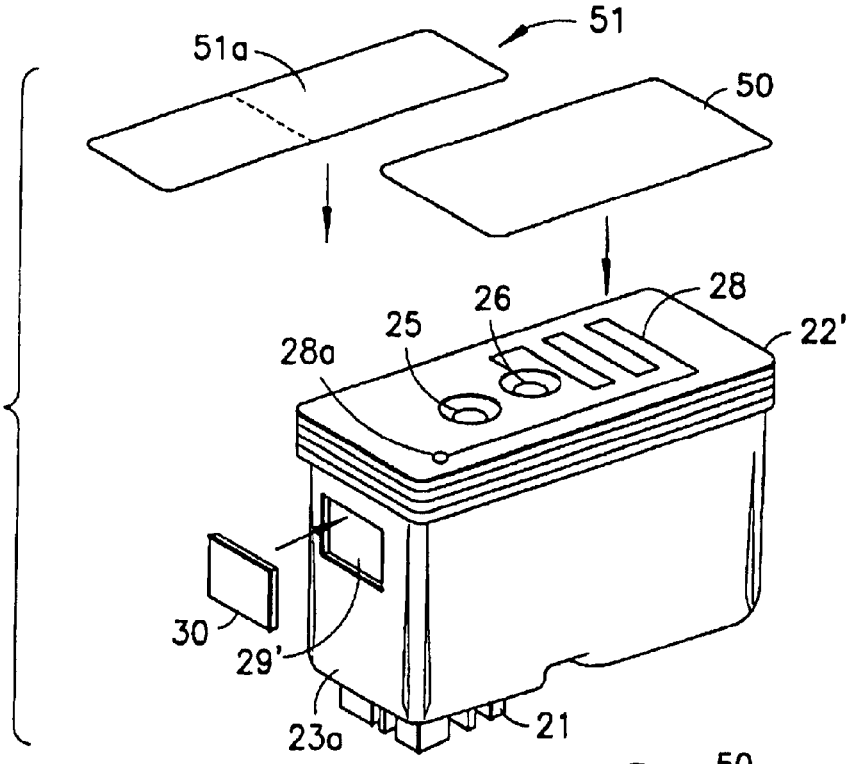
FIGS. 7(a) to 7(c) are perspective views respectively showing another embodiment of the ink cartridge in a state before a film is installed, in a state in which a film is installed and in a state in which a part of a film is peeled for use.
Figure 7B:
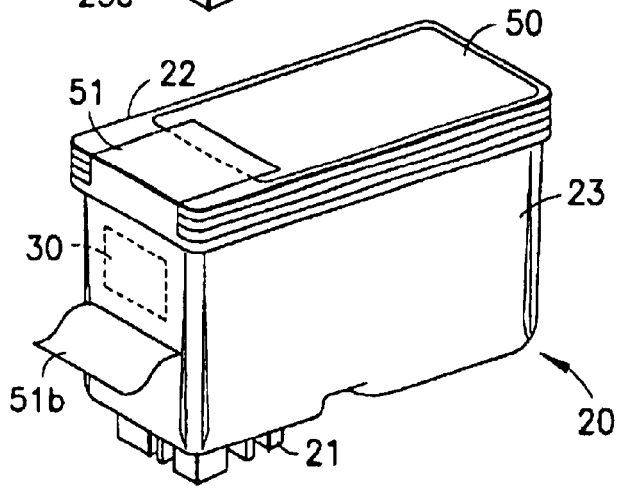
Figure 7C:
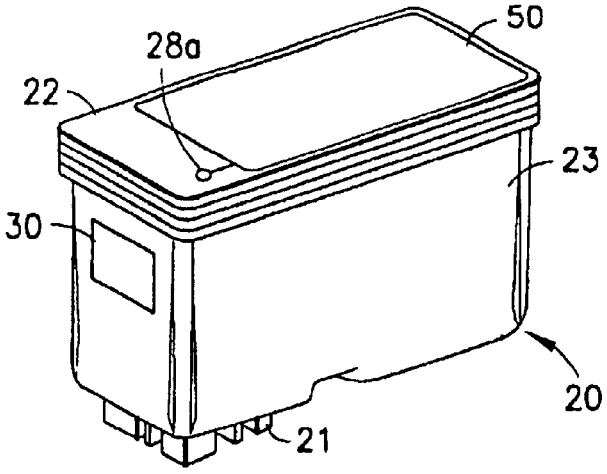

FIGS. 7(a) to 7(c) respectively show another embodiment of the ink cartridge according to the present invention. In this embodiment, a recessed portion 29' is formed on one of the side wall 23a of a container 23 serving as the ink cartridge. Preferably a side closest to the ink supply port 21 chosen and memory device 30 is closer to ink supply port 21. The above memory device 30 is fitted in the recessed portion 29' in the side wall 23a.

A lid 22' including an ink inlet port 25, an air communicating port 26 and a fine, circuitous groove 28 performing a capillary action positioned on the lid 22' in the vicinity of a port 21 are open to the air and therefore are sealed by a first sealing film 50. In addition, an air communication hole 28a is formed on lid 22' in the vicinity of the recessed portion 29'. The air communication hole 28a is sealed by a second sealing film 51 which can be peeled so that the second film overlaps with a part of the first film 50. An adhesive is applied only to the stuck area 51a of the second film 51 and one end 51b is kept in a lifted state so that it functions as a handhold when the second film is peeled off.

Figure 8:
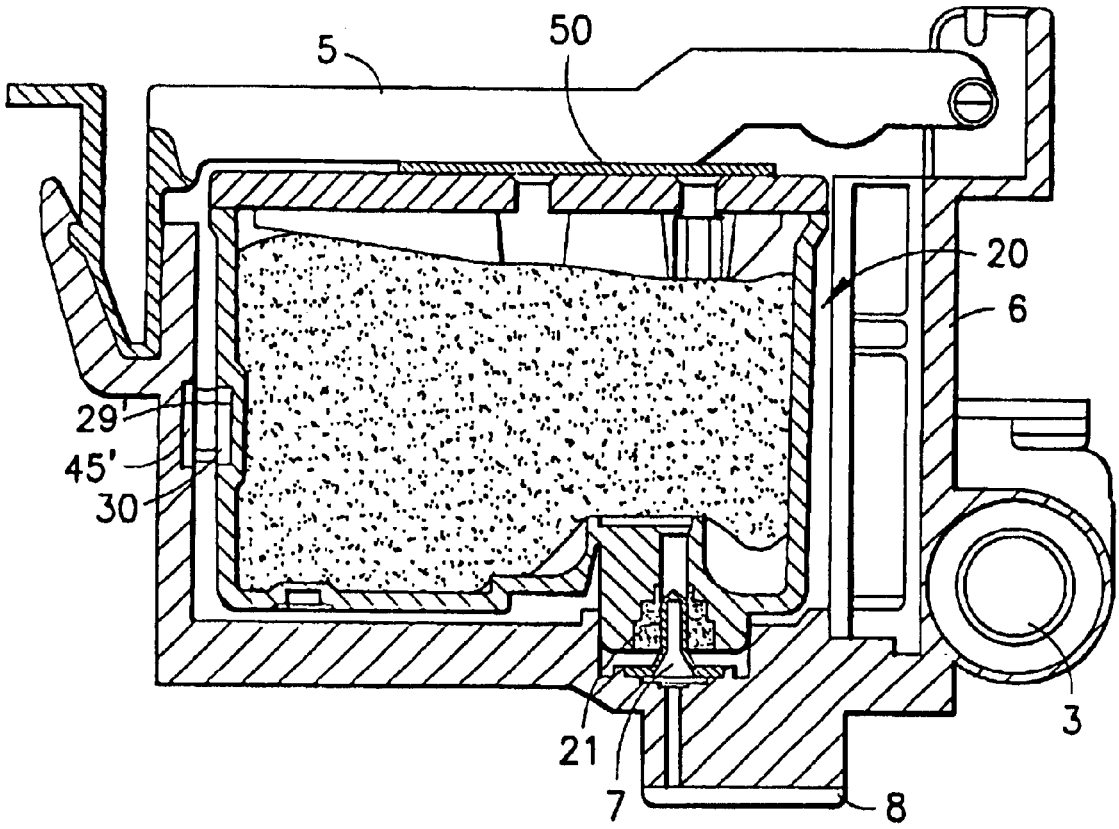
FIG. 8 is a sectional view showing the structure of a holder suitable for the ink cartridge of FIG. 7(c) in a state in which the ink cartridge is installed.

When the ink cartridge is installed in a normal position as shown in FIG. 8, a group of contacts 45' are arranged in a position opposite to the recessed portion 29' of the ink cartridge 20 in which the memory device 30 is provided.

In this embodiment, when the second sealing film 51 is peeled as shown in FIG. 7(c), the fine groove 28 becomes open to the air and the memory device 30 on the side wall 23a is exposed. In this state, when the ink cartridge 10 is installed in a holder 6 and the lever 5 is pivoted to close holder 6, each of the group of contacts 45' comes into contact with the respective electrode 34 of the memory device 30 when an ink supply needle 7 is inserted into an ink supply port 21 as shown in FIG. 8. The information of the ink cartridge 20 stored on the memory device 30 is read out and the proper or optimum printing is realized.

In the above embodiments, the recessed portions are formed respectively in the lid 22 of the ink cartridge or in the container 23 and the memory device 30 is housed in the recessed portion. According to other embodiments as shown in FIGS. 9(a)–9(c) and 10(a)–10(c), a memory device 30 is secured to a label or sticker affixed on each surface of respective areas 52a and 53a left on an ink cartridge after unsealing of sealing films 52 and 53 stuck on the ink cartridge 20. Therefore, the accurate positional relationship of the memory device 30 can be achieved.

Figure 9A:
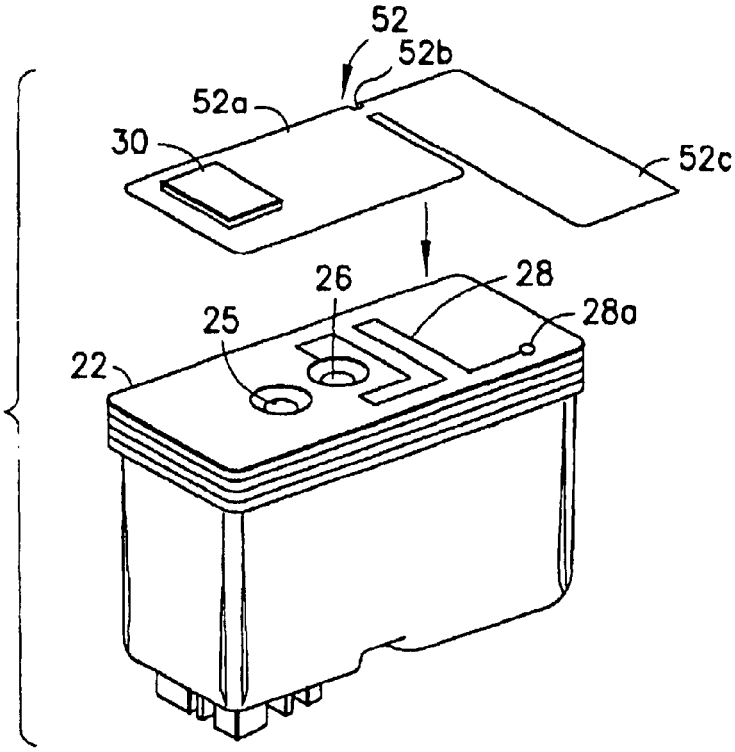
FIGS. 9(a) to 9(c) and FIGS. 10(a) to 10(c) are perspective views respectively showing the other embodiments of the ink cartridge in a state before a film is installed, in a state in which a film is installed and in a state in which a part of a film is peeled for use.
Figure 9B:
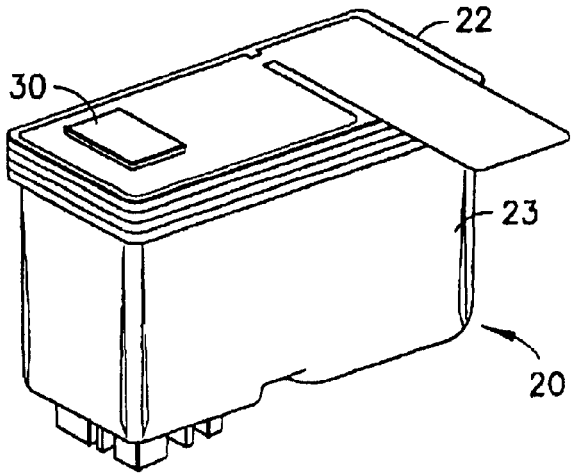
Figure 9C:
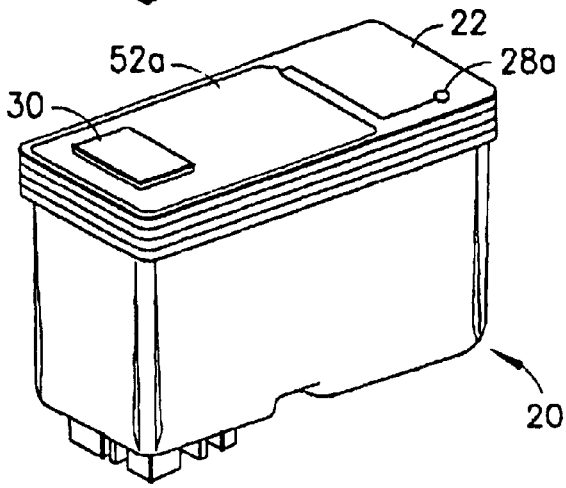
Figure 10A:
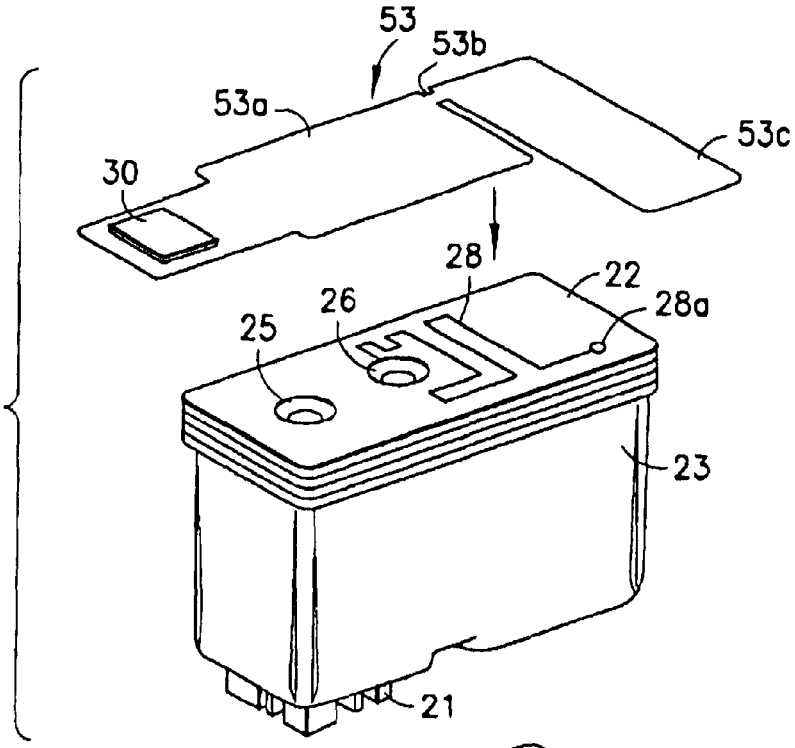
Figure 10B:
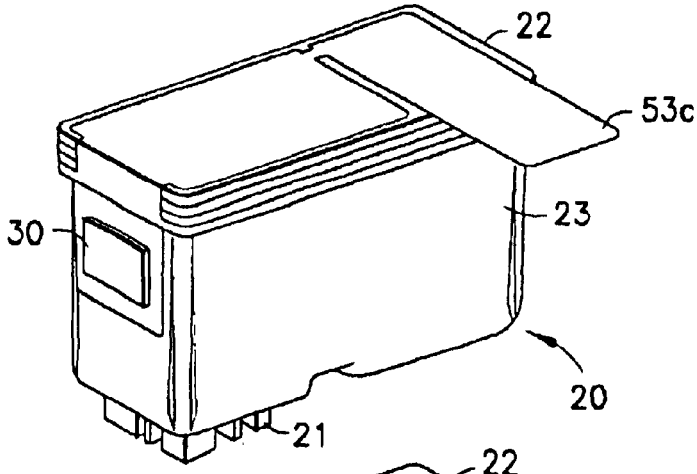
Figure 10C:
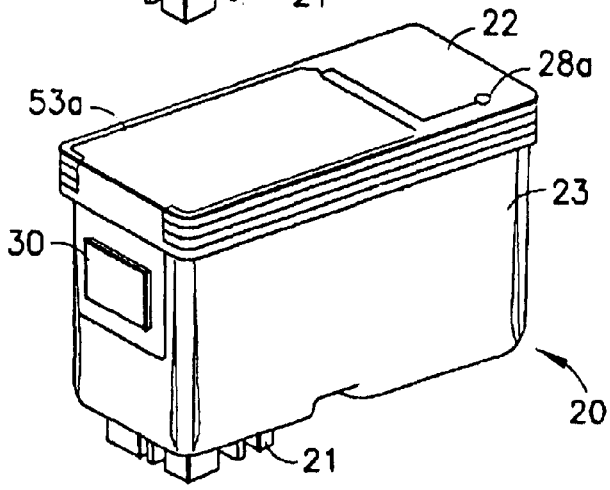

As shown in FIGS. 9(a) to 9(c), a memory device 30 is attached or adhered onto a first sealing part 52a of the sealing film 52, and a second sealing part 52c is removed when the ink cartridge is in use so that the air communication hole 28a becomes open to the atmosphere. The first sealing part 52a being connected to the second sealing part 52c by a bridge 52b. In an arrangement in FIGS. 10(a) to 10(c), an edge of the first sealing part 53a of the sealing film 53 extends to reach the side wall of the ink cartridge when the sealing film is attached to the cartridge, and the memory device 30 is attached or adhered to a part of the first sealing part 53a which is disposed on the side wall of the ink cartridge. A second sealing part 53c is removed when the ink cartridge is in use so that the air communication hole 28a becomes open to the atmosphere. The first sealing part 53a being connected to the second scaling part 53c by a bridge 53b. According to the arrangement, the width of the part of the first sealing part 53a, which is disposed on the side wall of the ink cartridge, is smaller than that of the other part of the first sealing part 53a as shown in FIGS. 10(a) to 10(c).

In these embodiments, after the film 52 or 53 is stuck on the lid 22 of the cartridge 20, the memory device 30 is fixed in a defined position by an adhesive and the like. On the other hand, after the memory device 30 is fixed in a defined position on the film beforehand, the film 52 or 53 is stuck on the lid 22 so that the memory device 30 is located in a defined position of the cartridge.

According to the foregoing embodiments, the above recessed portions 29 and 29' for housing the memory device in the lid 22 and the container 23 respectively composing the ink cartridge are not required. As a result the manufacturing process can be simplified, and the memory device can be readily provided to the ink cartridge without changing a metal mold for injection molding used for manufacturing a conventional type ink cartridge.

Figure 11:
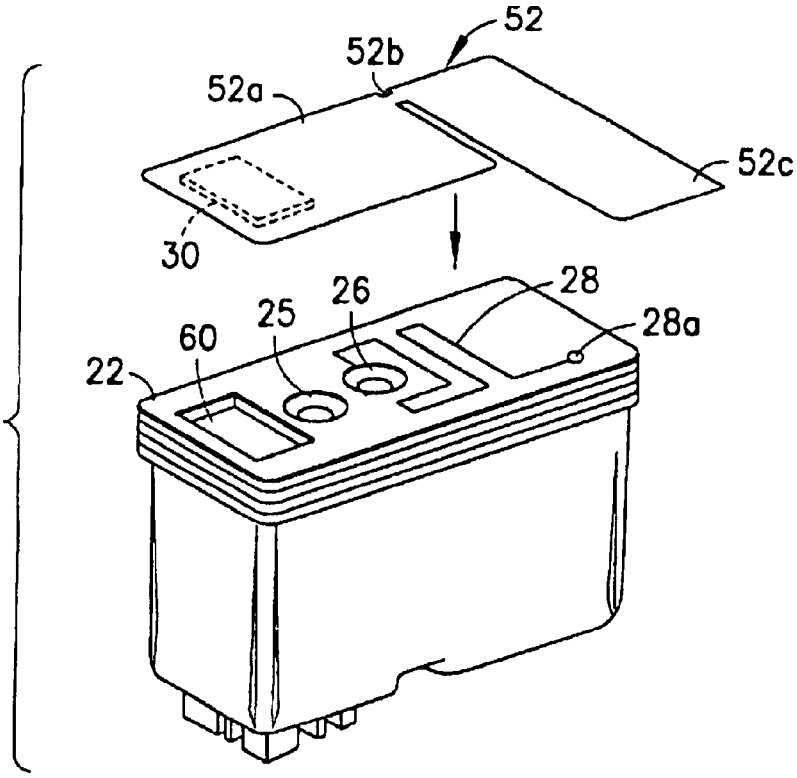
FIG. 11 is a perspective view showing a sealing film for an ink cartridge according to another embodiment of the invention.

FIG. 11 is a perspective view showing a sealing film 52 for an ink cartridge according to another embodiment of the present invention. In this embodiment, the position of the memory device 30 is that shown in FIG. 9. As shown in FIG. 11, a memory device 30 is attached onto a sticking side of a sealing film 52 so that the memory device 30 may be fitted in a recessed portion 60 formed in the lid 22 of the ink cartridge. It is necessary to form the recessed portion 60 in this embodiment, however, the memory device 30 is readily assembled to the ink cartridge 20 in the sealing film attaching process during manufacturing. In addition, there arises no possibility of being damaged by external affect such as inadvertent touch by a person's fingers.

This type of ink cartridge can be realized in a printing apparatus having a non-contact type communication system as described below.

Figure 12:
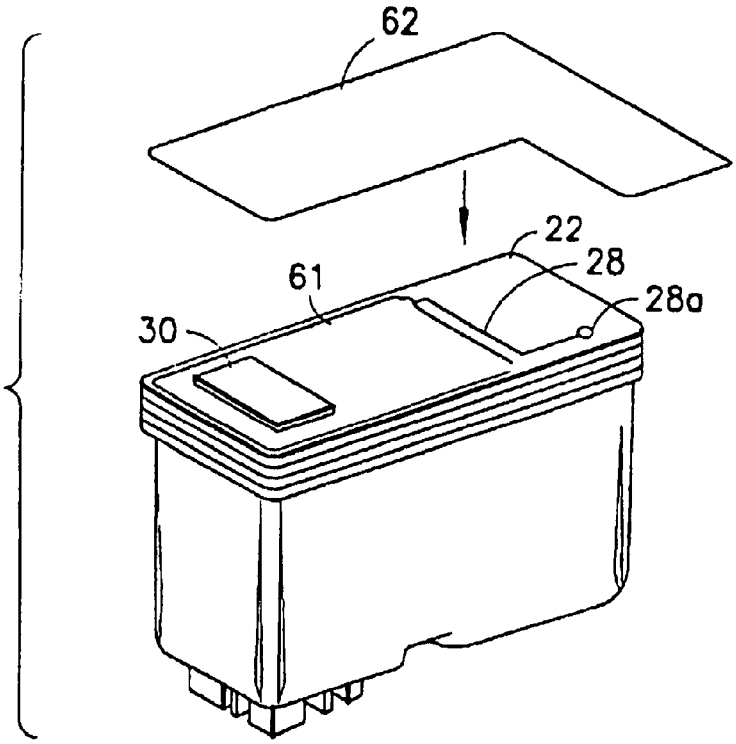
FIG. 12 is a perspective view of the ink cartridge and sealing films according to another arrangement of the invention.

FIG. 12 is a perspective view of the ink cartridge and sealing films according to another arrangement of the present invention. The sealing film of this arrangement includes a first film 61 onto which the memory device 30 is stuck and a second film 62 for sealing the air communication hole 28a and a part of the fine groove 28. Since the second film 62 has a size enough to cover the memory device 30 stuck on the first film 61, the similar advantage to the above can be accomplished. In addition, this type of the arrangement can also be employed in a printing apparatus having a contact type communication system.

Figure 13:
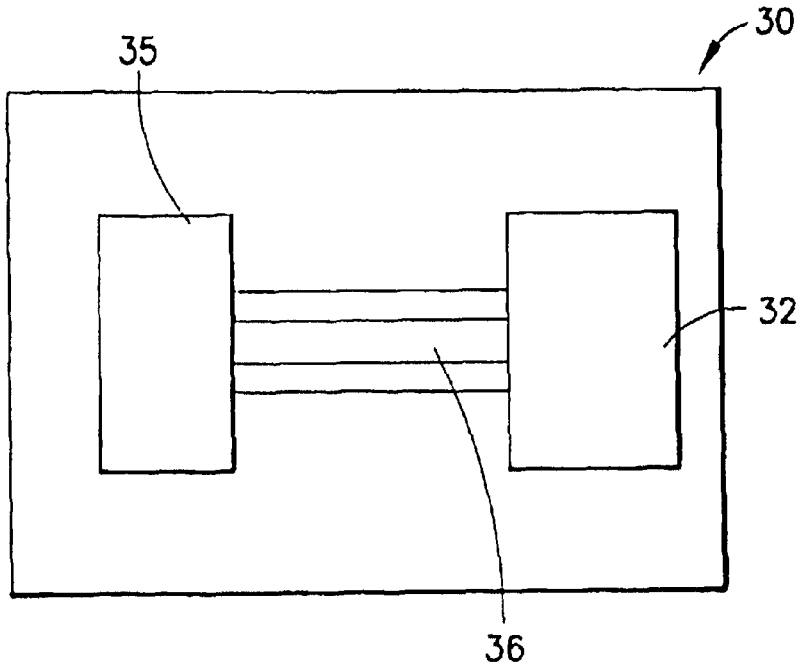
FIG. 13 is a top view showing still another embodiment of the memory device mounted on the ink cartridge.

In the above embodiments of the invention, communication between the semiconductor chip of the memory device and the printing apparatus is realized by contact between the electrodes and the group of contacts. However, as shown in FIG. 13, non-contact type communication may be employed such as radio-communication device 35. The non-contact type communication may include, for example an electromagnetic wave transmitting/receiving module, an optical communication module and an ultrasonic communication module. A semiconductor memory chip 32 can communicate in a non-contact state by mounting them on a circuit board and connecting the radio-communication means and the semiconductor memory chip 32 via a conductive pattern 36, and a problem caused by the failure of contact between an electrode and a contact can be avoided.

Further, according to the present invention, if desired, another type of information storing part may also be employed such as a magnetic recording medium other than the semiconductor memory chip.

According to the invention, the memory device 30 may be entirely constituted of a semiconductor chip if desired.

Also, in the above embodiments, the cartridge for housing one type of ink is described, however, it is clear that even if the present invention is applied to a color ink cartridge wherein a container is divided into plural chambers for housing different inks by a partition or partitions and ink supply ports communicating with each chamber are formed, the similar action is produced.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An ink jet printer comprising:

a print head including a plurality of nozzles through which ink is ejected;

an ink supply needle connecting to said print head;

a detecting device for detecting information stored in a memory device; and a control section connected to said detecting device and receiving information from said detecting device;

an ink cartridge for containing ink therein, said ink cartridge being mountable on the printer and engageable with said ink supply needle, said ink cartridge comprising:

a housing having an opening and a wall;

a lid covering said opening of said housing;

an ink supply port formed on said wall of said housing, said ink supply port being engageable with said ink supply needle;

said memory device storing information about the ink cartridge mounted on one of said housing and said lid and;

a seal member affixed to a part of said housing or said lid, said seal member having been constructed and positioned to cover said memory device at least before the ink cartridge is initially mounted on the printer.

2. The ink jet printer of claim 1, wherein said memory device is mounted on said lid.

3. The ink jet printer of claim 1, wherein said memory device is mounted on said wall of said housing.

4. The ink jet printer of claim 1, further comprising a recess formed in said lid and said memory device is mounted in said recess.

5. The ink jet printer of claim 1, said housing further comprising a side wall, a recess formed in said side wall of said housing, and said memory device being mounted in said recess.

6. The ink jet printer of claim 4, wherein said memory device is disposed across a gap from said seal member.

7. The ink jet printer of claim 5, wherein said memory device is disposed across a gap from said seal member.

8. The ink jet printer of claim 1, wherein said ink cartridge further comprises an air communication hole and a fine groove formed in said lid, said air communication hole and fine groove being covered by said seal member.

9. The ink jet printer of claim 1, wherein said seal member comprises a first seal part and a second seal part, said second seal part being removable.

10. The ink jet printer of claim 9, wherein said memory device is covered with said second seal part and exposed when said second seal part is removed.

11. The ink jet printer of claim 9, wherein said memory device is secured on an outer surface of said first seal part.

12. The ink jet printer of claim 9, wherein said first seal part is separated from said second seal part.

13. The ink jet printer of claim 9, wherein said first seal part partly connects to said second seal part.

14. The ink jet printer of claim 1, wherein said seal member is formed from air impermeable material.

15. The ink jet printer of claim 1, wherein said seal member is formed from conductive material.

16. The ink jet printer of claim 1, wherein said detecting device comprises a non-contact type communication system.

17. The ink jet printer of claim 16, wherein said non-contact type communication system comprises an electromagnetic wave communication device.

18. The ink jet printer of claim 16, wherein said non-contact type communication system comprises an optical communication device.

19. The ink jet printer of claim 16, wherein said non-contact type communication system comprises an ultrasonic wave communication device.

20. The ink jet printer of claim 1, wherein said memory device comprises at least one electrode, and said detecting device comprises at least one terminal which is engageable with said electrode of said memory device.

21. The ink jet printer of claim 1, wherein said memory device comprises a semiconductor chip.

22. An ink cartridge for an ink jet printer, comprising:

a housing for containing ink therein having an opening and a wall;

a lid covering said opening of said housing;

an ink supply port formed on said wall of said housing, said ink supply port constructed to discharge ink out of said housing;

a memory device, storing information about the ink cartridge, being mounted on one of said lid or said housing; and a seal member affixed to a part of said housing or said lid, said seal member constructed and positioned to cover said memory device at least before the ink cartridge is initially mounted on the printer.

23. The ink cartridge of claim 22, wherein said memory is mounted on said lid.

24. The ink cartridge of claim 22, wherein said housing includes a side wall, said memory being mounted on side wall.

25. The ink cartridge of claims 24, wherein said memory device is separated from said seal member by a gap.

26. The ink cartridge of claim 22, further comprising a recess formed in said lid, and said memory device is mounted in said recess.

27. The ink cartridge of claims 26, wherein said memory device is separated from said seal member by a gap.

28. The ink cartridge of claim 22, said housing further comprising a side wall, a recess formed in the side wall and said memory device is mounted in said recess.

29. The ink cartridge of claim 22, further comprising an air communication hole and a fine groove formed in said lid.

30. The ink cartridge of claim 29, wherein said seal member covers said fine groove formed in said lid.

31. The ink cartridge of claim 29, wherein said memory device is disposed in the vicinity of said air communication hole.

32. The ink cartridge of claim 22, wherein said seal member comprises a first sea part and a second seal part, said second seal part being removable.

33. The ink cartridge of claim 32, wherein said memory device is covered with said second seal part and exposed when said second seal part is removed.

34. The ink cartridge of claim 32, wherein said memory device is secured on an outer surface of said first seal part.

35. The ink cartridge of claim 32, wherein said first seal part is separated from said second seal part.

36. The ink cartridge of claim 32, wherein said first seal part partly connects to said second seal part.

37. The ink cartridge of claim 32, wherein said memory device is disposed between said first seal part and said lid.

38. The ink cartridge of claim 22, wherein said seal member is formed from air impermeable material.

39. The ink cartridge of claim 22, wherein said seal member is formed from conductive material.

40. The ink cartridge of claim 22, wherein said memory device comprises a non-contact type communication system.

41. The ink cartridge of claim 22, wherein said memory device comprises at least one electrode.

42. The ink cartridge of claim 22, wherein said memory device comprises a semiconductor chip.

43. The ink cartridge of claim 22, wherein the seal member is constructed of material which protects the memory device from static electricity.

44. An ink cartridge for an ink jet printer, comprising:

a housing, for containing ink therein having an opening and a wall;

a lid covering said opening of said housing and an air communication hole and a fine groove formed in said lid;

an ink supply port formed on said wall of said housing, said ink supply port discharge ink out of said housing;

a memory device, storing information about the ink cartridge mounted on one of said lid and said housing; and a seal member affixed to a part of said housing or said lid and said memory device, said seal member constructed to cover said memory device at least before the ink cartridge is initially mounted to the printer;

wherein said seal member comprises a first seal part and a second seal part, and said air communication hole and said memory device are left exposed when said second seal part is removed.

45. The ink cartridge of claim 44, wherein said memory device is disposed between said first seal part and said lid.

46. An ink cartridge for an ink jet printer, comprising:

a housing for containing ink therein, said housing having an opening and a wall;

a lid covering said opening of said housing;

an ink supply port formed on said wall of said housing, said ink supply port constructed to discharge ink out of said housing;

a memory device, storing information about the ink cartridge;

a seal member affixed to a part of said housing or said lid, and associated with said memory device; and an air communication hole and a fine groove formed in said lid, wherein said seal member includes a first film on which said memory device is attached, and a second film covering, said memory device and said air communication hole.

47. An ink cartridge mountable onto an ink jet printer comprising:

a container having a wall and a lid;

a thin sticker stuck onto at least one of the wall and the lid wherein the thin sticker comprises at least one seal part;

a memory device stuck to said thin sticker, said memory device storing information of the ink cartridge and said thin sticker is larger in area than the memory device to provide an exposed surface.

48. The ink cartridge of claim 47, wherein said memory device is mounted on the lid of the ink cartridge.

49. The ink cartridge of claim 47, wherein said memory device is mounted on the wall of the ink cartridge.

50. The ink cartridge of claim 47, wherein said memory device is mounted in a recess formed in the lid of the ink cartridge.

51. The ink cartridge of claim 47, wherein said memory device is mounted in a recess formed in the wall of the ink cartridge.

52. The ink cartridge of claim 47, wherein said sticker member comprises a first seal part and a second seal part, said second seal part being removable.

53. The ink cartridge of claim 47, wherein said memory device is secured on an outer surface of said first seal part.

54. The ink cartridge of claim 52, wherein said first seal part of said sticker member is separated from said second seal part thereof.

55. The ink cartridge of claim 52, wherein said first seal part of said sticker member partly connects to said second seal part thereof.

56. The ink cartridge of claim 47, wherein said sticker member is formed from an air impermeable material.

57. The ink cartridge of claim 47, wherein said sticker member is formed from a conductive material.

58. The ink cartridge of claim 47, wherein said memory device comprises at least one electrode.

59. An ink jet printer comprising:

a print head including a plurality of nozzles through which ink is ejected;

an ink supply needle connecting to said print head;

a detecting device for detecting information stored in a memory device; and a control section connected to said detecting device and receiving information from said detecting device;

an ink cartridge for containing ink therein, said ink cartridge being mountable on the printer and engageable with said ink supply needle, said ink cartridge comprising:

a housing having an opening and a wall;

a lid covering said opening of said housing;

an ink supply port formed on said wall of said housing, said ink supply port being engageable with said ink supply needle;

said memory device storing information about the ink cartridge;

a seal member affixed to a part of said housing or said lid, said memory device being mounted on said seal member, said seal member being larger in area than the memory device to provide an exposed surface.

60. The ink jet printer of claim 59, wherein said detecting device comprises a non-contact type communication system.

61. The ink jet printer of claim 60, wherein said non-contact type communication system comprises an electromagnetic wave communication device.

62. The ink jet printer of claim 60, wherein said non-contact type communication system comprises an optical communication device.

63. The ink jet printer of claim 60, wherein said non-contact type communication system comprises an ultrasonic wave communication device.

64. The ink jet printer of claim 59, wherein said memory device comprises at least one electrode, and said detecting device comprises at least one terminal which is engageable with said electrode of said memory device.

65. An ink cartridge for an ink jet printer, comprising:

a housing for containing ink therein having an opening and a wall;

a lid covering said opening of said housing;

an ink supply port formed on said wall of said housing, said ink supply port discharging ink out of said housing;

a memory device, storing information about the ink cartridge; and a seal member affixed to a part of said housing or said lid, said memory device being mounted on said seal member, said seal member being larger in area than the memory device to provide an exposed surface.

66. The ink cartridge of claim 65, wherein said memory device is located opposite said lid with respect to said seal member.

67. The ink cartridge of claim 65, wherein said housing includes a side wall, said memory device being located opposite said side wall with respect to said seal member.

68. The ink cartridge of claim 65, further comprising a recess formed in said lid, and said memory device is amounted in said recess.

69. The ink cartridge of claim 65, further comprising an air communication hole and a fine groove formed in said lid.

70. The ink cartridge of claim 69, wherein said seal member covers said fine groove formed in said lid.

71. The ink cartridge of claim 69, wherein said seal member comprises a first seal part and a second seal part, and said air communication hole and said memory device are left open when said second seal part is removed.

72. The ink cartridge of claim 71, wherein said memory device is disposed between said first seal part and said lid.

73. The ink cartridge of claim 71, wherein said seal member comprises a first film on which said memory device is attached and a second film covering said memory device and said air communication hole.

74. The ink cartridge of claim 65, wherein said seal member comprises a first seal part and a second seal part, said second seal part being removable.

75. The ink cartridge of claim 74, wherein said memory device is covered with said second seal part and exposed when said second seal part is removed.

76. The ink cartridge of claim 74, wherein said memory device is secured on an outer surface of said first seal part.

77. The ink cartridge of claim 74, wherein said first seal part is separated from said second seal part.

78. The ink cartridge of claim 74, wherein said first seal part partly connects to said second seal part.

79. The ink cartridge of claim 65, wherein said seal member is formed from air impermeable material.

80. The ink cartridge of claim 65, wherein said seal member is formed from conductive material.

81. The ink cartridge of claim 65, wherein said memory device comprises a non-contact type communication system.

82. The ink cartridge of claim 65, wherein said memory device comprises at least one electrode.

83. The ink cartridge of claim 65, wherein said memory device comprises a semiconductor chip.

* * * * *